United States Patent [19]

Sikorski et al.

[11] 4,433,996

[45] Feb. 28, 1984

[54] AMINOSULENAMIDE DERIVATIVES OF N-PHOSPHONOMETHYLGLYCINONITRILES AS HERBICIDES

[75] Inventors: James A. Sikorski, West Lafayette, Ind.; Mary A. Hoobler, Creve Coeur, Mo.

[73] Assignee: Monsanto Company, St. Louis, Mo.

[21] Appl. No.: 309,324

[22] Filed: Oct. 5, 1981

[51] Int. Cl.$^3$ .......................... A01N 57/22; C07F 9/40
[52] U.S. Cl. .................................. 71/087; 260/239 B; 260/940; 546/22; 548/413
[58] Field of Search ............... 71/87; 260/940, 239 B; 546/2 L; 548/413

[56] References Cited

U.S. PATENT DOCUMENTS

| | | | |
|---|---|---|---|
| 2,807,615 | 9/1957 | Hiurel | 564/102 |
| 4,008,296 | 2/1977 | Barton | 71/86 |
| 4,067,719 | 1/1978 | Dutra | 71/86 |
| 4,252,554 | 2/1981 | Dutra et al. | 71/87 |
| 4,302,451 | 11/1981 | Holyoke, Jr. | 260/940 |

OTHER PUBLICATIONS

Fabrick A. G., Badische Anilin and Soda, Chemical Abstracts, vol. 57, p. 13771, German Patent 1,131,222.
Unvarified Translation of Japanese Patent 142,047, 5/1976.

*Primary Examiner*—Anton H. Sutto
*Attorney, Agent, or Firm*—Gordon F. Sieckmann; Richard H. Shear; Howard C. Stanley

[57] ABSTRACT

This invention relates to aminosulfenamide derivatives of N-phosphonomethylglycinonitriles which are useful as herbicides and a process for preparing these compounds. This invention further relates to herbicidal compositions containing such derivatives and to herbicidal methods employing such compounds and compositions.

47 Claims, No Drawings

AMINOSULENAMIDE DERIVATIVES OF N-PHOSPHONOMETHYLGLYCINONITRILES AS HERBICIDES

This invention relates to aminosulfenamide derivatives of N-phosphonomethylglycinonitriles which are useful as herbicides and a process for preparing these compounds. This invention further relates to herbicidal compositions containing such derivatives and to herbicidal methods employing such compounds and compositions.

U.S. Pat. No. 4,067,719 issued to Gerard A. Dutra on Jan. 10, 1978 discloses N-phosphonomethylglycinonitriles of the formula

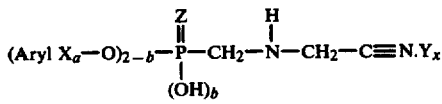

wherein (Aryl) is selected from phenyl, naphthyl or biphenylyl, each X is a substituent on said Aryl selected from halogen, alkyl of 1 to 4 carbon, alkoxy and alkylthio of 1 to 3 carbons, alkoxycarbonyl of 2 to 3 carbon atoms, methylenedioxy, cyano, trifluoromethyl or nitro, Z is oxygen or sulfur, a is an integer from zero to 3, b is an integer from zero to 1, Y is a strong acid capable of forming a salt with the amino group, and x is zero or 2, provided that x must be zero when b is 1, as well as a process for producing such compounds. These N-phosphonomethylglycinonitriles are said to be useful as herbicides.

U.S. Pat. No. 4,008,296 issued to John Edward D. Barton on Feb. 15, 1977 describes ester derivatives of N-phosphonomethylglycinonitrile having the formula

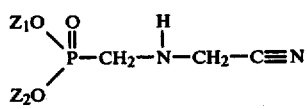

wherein $Z_1$ and $Z_2$ each represent an alkyl radical of from 1 to 6 carbon atoms; which are said to be useful as herbicides.

Japanese L.O.P. No. 142047/1977 discloses phenylcyanomethylaminomethylphosphonates of the formula

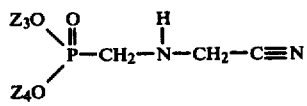

wherein $Z_3$ is hydrogen or phenyl and $Z_4$ is phenyl. Japanese L.O.P. No. 93323/1974 describes the preparation of N-(diethylphosphonomethyl)aminoacetonitrile.

U.S. Pat. No. 4,252,554 issued to Gerard A. Dutra et al on Feb. 24, 1981 discloses compounds represented by the formula

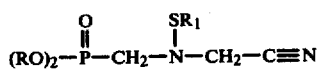

wherein R is phenyl, naphthyl or biphenylyl or phenyl, naphthyl or biphenylyl substituted with from 1 to 3 substituents independently selected from the group consisting of lower alkyl, lower alkoxy, lower alkylthio, alkoxycarbonyl, methylenedioxy, trifluoromethyl, cyano, nitro and halogen; and $R_1$ is phenyl or phenyl substituted with from 1 to 3 substituents independently selected from the group consisting of lower alkyl, lower alkoxy, halogen, trifluoromethyl and nitro.

In accordance with the present invention, aminosulfenamide derivatives of N-phosphonomethylglycinonitriles of the formula

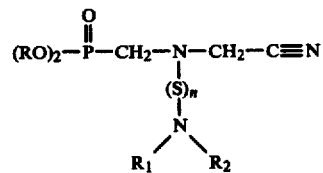

wherein n is an integer 1 or 2 and wherein R is selected from the group consisting of phenyl, naphthyl, or biphenylyl; or phenyl, naphthyl or biphenylyl substituted with from 1 to 3 substituents independently selected from the group consisting of lower alkyl, lower alkoxy, lower alkylthio, alkoxycarbonyl, methylenedioxy, trifluoromethyl, cyano, nitro and halogen; and wherein $R_1$ and $R_2$ are independently selected from the group consisting of hydrogen, cycloalkyl, alkyl, alkyl substituted with 1 or 2 substituents independently selected from the group consisting of lower alkoxy, lower alkylthio, cyano, lower alkoxycarbonyl, bis(aryloxy)phosphinyl wherein said aryl portion thereof corresponds to a group selected from R, phenyl or phenyl substituted with 1 or 2 substituents independently selected from the group consisting of lower alkyl and lower alkoxy; acyl or aroyl; or $R_1$ and $R_2$ are independently selected from the aforerecited groups and joined together to form a cyclic structure having 4–8 atoms therein are prepared by reacting a compound of the formula

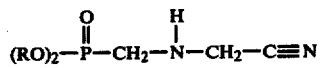

wherein R is as aforedefined with sulfur dichloride in an aprotic solvent and in the presence of a hydrogen chloride acceptor to form a compound of the formula

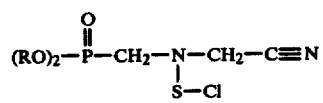

wherein R is as aforedefined.

The reaction temperature for the aforerecited reaction is in the range from about −50° C. to about 100° C., and is preferably from about −20° C. to about +30° C., although greater or lower temperatures may be employed if desired.

It is preferred to add a compound of formula (II) to the sulfur dichloride rather than vice versa so as to minimize the possibility of having excess compound of formula (II) in the presence of sulfur dichloride whereby a bisglyphosate adduct an undesired coproduct, could be formed.

In preparing the compounds of formula (III), the ratio of reactants of formula (II) and sulfur dichloride, is not narrowly critical. For best results, however, for each mole of a compound of formula (II), one should employ one mole of sulfur dichloride to produce one mole of a compound of formula (III). It is preferred to employ an excess of sulfur dichloride for ease of reaction and maximum yield of product of formula (III). The 2:1 adduct byproduct and an amine hydrochloride formed along with a compound of formula (III) are generally separated therefrom as a precipitate.

The compound of formula (III) is reacted with a compound of the formula

wherein $R_1$ and $R_2$ are as aforedefined, and M is hydrogen or an alkali metal such as sodium, potassium or lithium, in an aprotic solvent to form a compound of formula (I).

In an embodiment when M is hydrogen, the aforedescribed reaction of a compound of formula (IV) with a compound of formula (III) is conducted in the presence of a hydrogen chloride acceptor; however use of a hydrogen chloride acceptor is replaced by use of a suitable phase transfer catalyst when M is selected as an alkali metal.

Typical phase transfer catalyst include tetra alkyl ammonium salts such as the tetra alkyl ammonium halogen salts such as tetraethyl ammonium chloride, benzyltriethyl ammonium chloride and the like.

In reacting a compound of formula (III) with a compound of formula (IV), the temperature is in the range from about −50° C. to about 100° C. and is preferably from about −20° C. to about +30° C. although greater or lower temperatures may be employed if desired.

The ratio of compounds of formula (III) to compound of formula (IV) is not critical. For best results, however, one should employ for each mole of a compound of formula (III) a mole of a compound of formula (IV). Typically a molar excess of compound of formula (IV) is employed.

Typical compounds which may be employed as a compound of formula (IV) include compounds such as dimethylamine, diisopropylamine, diethylamine, dibutylamine, diphenylamine, piperidine, morpholine, thiomorpholine, N-[(diphenoxyphosphinyl)methyl]-glycinonitrile potassium phthalimide and the like.

It is preferred that R is phenyl or phenyl substituted with lower alkoxy in the ortho or para position. $R_1$ and $R_2$ are preferably alkyl such as methyl, ethyl, isopropyl, octyl, or phenyl or cyclohexyl, or cyclic such as morpholino or piperidino.

Illustrative of the substituted phenyl groups which R, $R_1$ and $R_2$ independently represent are mono-substituted phenyl wherein the substituent is in the ortho, meta or para position, for example, methylphenyl, butylphenyl, methoxyphenyl, butoxyphenyl, fluorophenyl, chlorophenyl, bromophenyl, iodophenyl, trifluoromethylphenyl, nitrophenyl, methylthiophenyl, butylthiophenyl, cyanophenyl, ethoxycarbonylphenyl, and the like, and the di- and tri- substituted phenyl groups wherein the substituents are the same or different and are located in the 2, 3, 4, 5 or 6 positions of the phenyl ring, for example, dichlorophenyl, dimethylphenyl, methylchlorophenyl, ethylfluorophenyl, dibutoxyphenyl, butylnitrophenyl, methylthiochlorophenyl, di(ethylthio)phenyl, trimethylphenyl, trichlorophenyl, tributylphenyl, ethyldichlorophenyl and the like.

Groups representative of a substituted naphthyl groups represented by R include methylnaphthyl, nitronaphthyl, bromonaphthyl, dimethylnaphthyl, difluoronaphthyl, trimethylnaphthyl and the like.

Groups representative of substituted biphenylyl groups represented by R include methylbiphenylyl, nitrobiphenylyl, bromobiphenylyl, dimethylbiphenylyl, difluorobiphenylyl, trimethylbiphenylyl and the like.

As employed herein, the term "lower alkyl" designates alkyl radicals which have from 1 to 4 carbon atoms in a straight or branched chain, for example, methyl, ethyl, propyl, isopropyl, butyl, isobutyl, sec-butyl, and t-butyl.

The term "halo" or "halogen" as employed herein means chlorine, bromine, iodine and fluorine.

The term "lower alkoxy" includes groups representative of the term "lower alkyl" in combination with oxygen and includes methoxy, ethoxy, propoxy, butoxy mixtures thereof and the like.

The term "lower alkylthio" includes representatives of lower alkyl in combination with sulfur.

The term "lower alkoxycarbonyl" includes groups representative of the aforedefined term "lower alkoxy" in combination with a carbonyl group.

The term "alkyl" is employed throughout the claims and description to mean a substituted or unsubstituted monovalent radical in a straight or branched chain of the formula $C_nH_{2n+1}-$ derived from an aliphatic hydrocarbon by removal of one hydrogen therefrom wherein n is an integer from 1 to 8.

The term "acyl" is employed throughout the claims and description to mean an organic radical derived from an organic acid by removal of the hydroxy group and is of the form

wherein $R^1$ is alkyl as defined herein.

The term "aroyl" is employed throughout the claims and description to mean a radical of the formula

wherein $R^1$ is aryl, phenyl, naphthyl or biphenylyl as aforedefined herein.

Typical groups representative of the term "alkyl" includes groups representative of the term "lower alkyl" as well as groups such as n-pentyl, n-hexyl, n-heptyl, n-octyl, isopentyl, neopentyl, isohexyl, 2-methylpentyl, 2,2-dimethylbutyl, 2,3-dimethylbutyl and the like.

Typical groups representative of the embodiment wherein $R_1$ and $R_2$ are joined together to form a cyclic arrangement include morpholino, piperidino, thiomorpholino, phthalimido and the like.

The term "cycloalkyl" is employed throughout the claims and description to mean carbon and hydrogen atoms arranged in a cyclic or ring arrangement having 3 to 8 carbon atoms therein. Typical groups representative of the term "cyclohexyl" include cyclopentyl, cyclohexyl, cyclopropyl, cyclooctyl and the like.

The hydrogen chloride acceptor is typically an amine, preferably a tertiary amine, which will not react with the reactants employed or products formed. Examples of suitable tertiary amine hydrogen chloride acceptors include trimethylamine, triethylamine, tributylamine, trihexylamine, 1,5-diazabicyclo-[5.4.0]-undec-5-ene, pyridine, quinoline, mixtures thereof and the like.

Due to the reactive nature of the various reaction intermediates and reactants, the process of the present invention should be conducted in an aprotic solvent under essentially anhydrous conditions. Illustrative of the aprotic solvents employed in the process of this invention include benzene, toluene, methylene chloride, tetrahydrofuran, cyclohexane, methylcyclohexane, hexane, octane, dioxane, ethyl ether, mixtures thereof and the like, although a solvent is not required.

While the processes of this invention can be conducted at atmospheric, sub-atmospheric or super-atmospheric pressure, for convenience and economy it is generally preferred to conduct these processes at atmospheric pressure.

Also in accordance with this invention, compounds of formula (I) are prepared by a process comprising reacting a compound of the formula

wherein R is as aforedefined with a compound of the formula

(also shown as $R_1R_2NSCl$)
wherein $R_1$ and $R_2$ are as aforedefined in an aprotic solvent and in the presence of a hydrogen chloride acceptor, to form compounds of formula (I).

The temperature of the aforedescribed reaction is in the range from about $-50°$ C. to about $100°$ C. and is preferably from about $-10°$ C. to about $+30°$ C., although greater or lesser temperatures may be employed if desired.

The molar ratio of compounds of formula (II) to compounds of formula (V) is not narrowly critical. For best results one should employ for each mole of compound of formula (II) one mole of compound of formula (V). Typically an excess of compound of formula (V) is employed.

Typical compounds which may be employed as compounds of the formula $R_1R_2NSCl$ include those compound such as N,N disubstituted aminossulfenyl chlorides, wherein $R_1R_2N$ is phthalamido, morpholino, piperidino, dialkyl wherein alkyl is as aforedefined and the like.

The preparation of the aforedescribed and other N,N disubstituted aminosulfenyl chlorides is described in Chemical Abstracts Volume 57 page 13771, Badische Anilin & Soda-Fabrik A. G., Gunther Weise and Gerhard Schulze, noting Ger. Pat. No. 1,132,222 both of which are incorporated herein by reference in their entirety.

The following illustrative, non-limiting examples will serve to further demonstrate to those skilled in the art the process of this invention wherein specific compounds within the scope of this invention can be prepared. In the examples, all parts are parts by weight unless otherwise expressly stated.

EXAMPLE I

Part (a)

Preparation of Reactant Phosphonic acid, [[(cyanomethyl)-N-chlorothio]amino]methyl]-, diphenyl ester A solution of diphenylphosphonomethylglycinonitrile (4.5 g, 0.015 mol) corresponding to a compound of formula (II) wherein R is phenyl and triethylamine (1.5 g, 0.015 mol) in toluene was added to a pentane solution of sulfur dichloride (1.5 g, 0.015 mol) at 0° C. at such a rate that the temperature did not exceed +10° C. The yellow toluene supernatant was removed under nitrogen and concentrated in vacuo to a yellow oil which became light brown upon drying overnight on a vacuum pump. The product corresponded to a compound of formula (III) wherein R is phenyl, (4.4 g 79%), having an analysis:

Calculated for $C_{15}H_{14}Cl_1N_2O_3P_1S_1$: C,48.85; H,3.82; N,7.60; S,8.69; Cl,9.61

Found: C,48.78; H,3.98; N,7.53; S,8.75; Cl,9.51.

Part (b)

Phosphonic acid, [[(cyanomethyl)-N-(1-piperidinylthio)amino]methyl]-, diphenyl ester. To a solution of piperidine (2.0 g, 0.024 mol) and triethylamine (2.4 g, 0.024 mol) in 200 ml of toluene at 0° C. was added a freshly prepared solution of phosphonic acid [[(cyanomethyl)-N-chlorothio)amino]methyl]-, diphenylester (9.7 g, 0.026 mol) prepared as described in Part (a) hereof in 30 ml of toluene. The reaction mixture was allowed to come to room temperature overnight and then the precipitate of triethylamine hydrochloride was removed by filtration. The toluene filtrate was washed with cold 10% aqueous NaOH and cold water, dried over MgSO₄, and then adsorbed onto 15 g of silica gel. Purification by HPLC on a 1"×4' silica gel column eluting with 60% cyclohexane, 40% ethyl acetate gave the desired product corresponding to a compound of formula (I) wherein n is 1, R is phenyl and $R_1$ and $R_2$ are joined together to form a heterocyclic ring, piperidinyl, as a yellow oil, 1.1. g (24%), $n_D{}^{25}=1.5600$, having an analysis Calculated for: $C_{20}H_{24}N_3O_3P_1S_1$: C,57.54; H,5.79; N,10.07; S,7.68;

Found: C,57.43; H,5.80; N,9.90; S,7.81.

EXAMPLE II

Phosphonic acid, [[(cyanomethyl)(4-morpholinylthio)amino]methyl]-, diphenyl ester. An oven-dried 500 ml 2-necked flask was cooled under nitrogen and charged with sulfur dichloride (11.8 g, 0.11 mol) and 200 ml of ether. This solution was cooled to $-20°$ C. and then a solution of morpholine (10 g, 0.11 mol) and triethylamine (11.5 g, 0.11 mol) in 100 ml of ether was added via double-ended needle at such a rate to maintain the reaction temperature below 0° C. The reaction mixture was stirred for 3 hours and filtered. The filtrate was stripped to a yellow semisolid (16 g, 100%), morpholine N-sulfenyl chloride, corresponding to a compound of formula (V) wherein $R_1$ and $R_2$ are joined together to form morpholino, following the methods of Chemical Abstracts and Ger. Pat. No. 1,132,222 supra which was taken up in methylene chloride. A portion of this solution (0.055 mol) was added slowly via a double ended needle to a cooled solution of diphenylphosphonomethylglycinonitrile (16.7 g, 0.055 mol) and triethylamine (5.6 g, 0.055 mol) in toluene. The reaction mixture was stirred for 2 hours allowing to slowly warm to room temperature, the triethylamine hydrochloride was removed by filtration, and the filtrate was washed with cold 10% aqueous NaOH followed by cold water, dried over MgSO$_4$, filtered and concentrated to 8 g of yellow oil. The oil was adsorbed onto 20 g silica gel and purified by HPLC on a 1"×4' column of silica gel to give the desired product corresponding to a compound of formula (I) wherein n is 1, R is phenyl and R$_1$ and R$_2$ are joined together to form a heterocyclic ring, morpholino, as a white solid, having a melting point 54°-57° C., in 26% yield. $^1$H NMR, $^{31}$P NMR, and elemental analysis were consistent with pure product.

Calculated for C$_{19}$H$_{22}$N$_3$O$_4$P$_1$S$_1$: C,54.41; H,5.29; N,10.02; S,7.64;

Found: C,54.42; H,5.33; N,10.00; S,7.61.

EXAMPLE III

Phosphonic acid, [[(cyanomethyl)[(1,3-dihydro-1,3-dioxo-2H-isoindol-2-yl)thio]amino]methyl]-, diphenyl ester. To an oven-dried 500 ml flask, cooled under nitrogen, was added potassium phthalimide (8.6 g, 0.023 mol) a salt illustrative of a compound of formula (IV), 250 ml of toluene and tetrabutyl ammonium chloride (0.65 g, 0.002 mol) as a phase transfer catalyst. No hydrogen chloride acceptor was employed. To this slurry was added a solution of phosphonic acid, [[(cyanomethyl-N-chlorothio]amino]methyl]-, diphenyl ester (8.6 g, 0.023 mol) in toluene and the resulting mixture was stirred at room temperature overnight. The potassium chloride was removed by filtration and the filtrate was washed with cold water, dried over MgSO$_4$, filtered, and adsorbed onto 20 g silica gel. Purification by HPLC on a 1"×4' column of silica gel gave the desired product corresponding to a compound of formula (I) wherein n is 1, R is phenyl and R$_1$ and R$_2$ are joined together to form a heterocyclic ring phthalimido as a yellow solid, having a melting point 79°-83° C., in 51% yield. $^1$H NMR, $^{31}$P NMR, and elemental analyses were consistent with pure product.

Calculated for C$_{23}$H$_{18}$N$_3$O$_5$P$_1$S$_1$: C,57.62; H,3.78; N,8.76; S,6.69;

Found: C,57.38; H,3.88; N,8.67; S,6.66.

EXAMPLE IV

Phosphonic acid, [[[(cyanomethyl)[(N,N-dimethylamino)thio]amino]methyl]-, diphenyl ester. An oven-dried 500 ml flask cooled under nitrogen was charged with 250 ml of toluene and triethylamine (2.8 g, 0.027 mol) and cooled to 0° C. To it was added excess anhydrous dimethyl amine. To the resulting solution was added via double ended needle a solution of phosphonic acid, [[(cyanomethyl-N-chlorothio]-amino]methyl]-, diphenyl ester (10 g, 0.027 mol) in 50 ml of toluene at such a rate to maintain the temperature below 10° C. The reaction mixture was stirred for 2 hours allowing to warm slowly to room temperature. The triethylamine hydrochloride was removed by filtration, and the filtrate was washed with cold 10% aqueous NaOH and cold water dried over MgSO$_4$, filtered and adsorbed onto 20 g of silica gel. Purification by HPLC on a 1"×4' column of silica gel gave the desired product corresponding to a compound of formula (I) wherein n is 1, R is phenyl and R$_1$ and R$_2$ are each methyl as a yellow oil, n$_D^{24.5}$=1.5575, in 41% yield. $^1$H NMR, $^{31}$P NMR, and elemental analysis were all consistent with pure product.

Calculated for: C$_{17}$H$_{20}$N$_3$O$_3$P$_1$S$_1$: C,54.10; H,5.34; N,11.13; S,8.50;

Found: C,54.30; H,5.38; N,11.02; S,8.40.

General Procedure For Examples V, VI, VII and VIII An oven-dried 500 ml flask cooled under nitrogen was charged with 200 ml of toluene, triethylamine, and the appropriate amine and cooled to 5° C. To it was added a solution of Phosphonic acid, [[[(cyanomethyl)-N-chlorothio]amino]methyl]-diphenyl ester in toluene at such a rate that the temperature did not exceed 10° C. The resulting yellow reaction mixture was stirred for 2-4 h, allowing to slowly warm to room temperature. The triethylamine hydrochloride was removed by filtration, and the toluene filtrate was washed with cold 10% aqueous NaOH and cold water, dried over MgSO$_4$, and concentrated to an oil. Purification by HPLC gave the desired products. $^1$H NMR, $^{31}$P NMR, and elemental analyses were all consistent with pure products.

EXAMPLE V

Phosphonic Acid, ((((Bis(1-methylethyl)amino)-thio)(cyanomethyl)amino)methyl)-,diphenyl ester corresponding to a compound of formula (I) wherein n is 1, R is phenyl and R$_1$ and R$_2$ are both 1-methylethyl was prepared following the aforedisclosed procedure. The product, a yellow oil, had a refractive index n$_D^{25}$=1.5430, and an analysis for C$_{21}$H$_{28}$N$_3$O$_3$PS:

Calculated: C, 58.18; H, 6.51; N, 9.69; S, 7.40

Found: C, 58.17; H, 6.52; N, 9.62; S, 7.41

EXAMPLE VI

Phosphonic acid, ((((cyanomethyl)(4-thiomorphlinylthio)amino)methyl)-,diphenylester corresponding to a compound of formula (I) wherein n is 1, R is phenyl, and wherein R$_1$ and R$_2$ are joined together to form a heterocyclic ring, thiomorpholino was prepared following the aforerecited procedure. The product, a yellow oil, had a refractive index of n$_D^{25}$=1.5778 and an analysis for C$_{19}$H$_{22}$N$_3$O$_3$PS$_2$:

Calculated: C, 52.40; H, 5.09; N, 9.65; S, 14.72

Found: C, 52.18; H, 5.12; N, 9.56; S, 14.62

EXAMPLE VII

Phosphonic acid, (((cyanomethyl)[(diphenylamino)-thio)amino)methyl)-,diphenyl ester corresponding to a compound of formula (I) wherein R, R$_1$ and R$_2$ are each phenyl was prepared following the aforerecited general procedure. The product, a yellow oil, had a refractive index of n$_D^{25}$=1.5930, and an analysis for C$_{27}$H$_{24}$N$_3$O$_3$PS:

Calculated: C, 64.66; H, 4.82; N, 8.38; S, 6.39

Found: C, 64.50; H, 4.90; N, 8.33; S, 6.34

EXAMPLE VIII

Phosphonic acid, (((cyanomethyl)(dibutylamino)thio)amino)methyl)-,diphenyl ester corresponding to a compound of formula (I) wherein n is 1, R is phenyl and R$_1$ and R$_2$ are each n-butyl was prepared following the aforerecited general procedure. The product, an orange oil, had a refractive index n$_D^{25}$=1.5330 and an analysis for C$_{23}$H$_{32}$N$_3$O$_3$PS:

Calculated: C, 59.85; H, 6.99; N, 9.10; S, 6.95

Found: C, 59.68; H, 7.06; N, 9.05; S, 6.89

General procedure for Examples IX, X, and XI.

An oven-dried 500 ml flask cooled under nitrogen was charged with 200 ml of toluene, cooled to −20° C. and the sulfur dichloride was added. To it was added slowly via cannula a solution of the appropriate compound of formula (II) and triethylamine in toluene, maintaining the temperature below $-10°$ C. The reaction mixture was stirred for 1–3 hours at $-20°$ C. The triethylamine hydrochloride was removed under nitrogen and the supernatant liquid was added slowly via cannula to a solution of the appropriate amine and triethylamine in toluene at either $0°$ C. or $-20°$ C. The reaction mixture was stirred overnight under a nitrogen atmosphere at room temperature. The triethylamine hydrochloride was removed by filtration, and the filtrate was washed with cold 10% aqueous NaOH followed by cold water, dried over $MgSO_4$, filtered, and stripped to an oil. Purification by HPLC on a Waters Prep Pak 500 silica gel column, eluting with 10–35% ethyl acetate/cyclohexane gave the desired products. $^1H$ NMR, $^{31}P$ NMR, and an elemental analyses were all consistent with pure products.

EXAMPLE IX

The compound prepared according to the aforerecited general procedure was phosphonic acid, (((cyanomethyl)(diethylamino)thio)amino)methyl)-,bis(2-methoxyphenyl) ester corresponding to a compound of formula (I) wherein n is 1, R is 2-methoxyphenyl and $R_1$ and $R_2$ are each ethyl. The product, a brown oil, had a refractive index $n_D^{22.6} = 1.5484$ and an analysis for $C_{21}H_{28}N_3O_5PS$:

Calculated: C, 54.18; H, 6.06; N, 9.02; S, 6.89
Found: C, 53.58; H, 6.10; N, 8.93; S, 6.89

EXAMPLE X

The compound prepared herein according to the aforerecited general procedure was phosphonic acid, (((cyanomethyl)(1-piperidinylthio)amino)methyl)-bis(4-chloro-3-methylphenyl)ester corresponding to a compound of formula (I) wherein n is 1, R is 4-chloro-3-methyl-phenyl and $R_1$ and $R_2$ are joined together to form a heterocyclic ring, piperidinyl. The product, a tan solid, had a m.p. of $64°–67°$ C. and elemental analysis for $C_{22}H_{26}Cl_2N_3O_3PS$:

Calculated: C, 51.37; H, 5.09; N, 8.17; S, 6.23; Cl, 13.78
Found: C, 51.20; H, 5.14; N, 8.11; S, 6.16; Cl, 13.72

EXAMPLE XI

Phosphonic acid, [[(cyanomethyl)(diethylamino)-thio]amino]methyl]; bis(4-methoxyphenyl) ester corresponding to a compound of formula (I) wherein n is 1, R is 4-methoxyphenyl and $R_1$ and $R_2$ are each ethyl was prepared following the aforerecited procedure as a yellow oil having a refractive index $n_D^{24.2} = 1.5430$ and an analysis for $C_{21}H_{28}N_3O_5PS$:

Calculated: C, 54.18; H, 6.06; N, 9.03; S, 6.89;
Found: C, 53.98; H, 6.11; N, 8.95; S, 6.85.

EXAMPLE XII

Phosphonic acid, dithiobis[[(cyanomethyl)imino]bis(-methylene)]bis-, tetraphenyl ester. A solution of p-toluenethiosulfonyl chloride (0.05 mol) was prepared by adding p-thiocresol (6.2 g, 0.05 mol) in 100 ml of pentane to a pentane solution of sulfur dichloride (5.2 g, 0.05 mol) at $-20°$ C. The solution was allowed to warm to $+5°$ C. over 2 hours, and then was added to a solution of diphenylphosphonomethylglycinonitrile (15.0 g, 0.05 mol) and triethylamine (5.0 g, 0.05 mol) in 400 ml of toluene at $10°$ C. This reaction was allowed to come to room temperature over a 2 hour period. The precipitate of triethylamine hydrochloride was removed by filtration. The toluene filtrate was washed with cold aqueous 10% NaOH and cold water dried over $MgSO_4$, filtered and absorbed onto silica gel. Purification by HPLC on a $1'' \times 4'$ silica gel column eluting with 60% cyclohexane/40% ethylacetate gave the desired arylthiosulfenamide product. Also isolated was the unexpected dithiobis adduct corresponding to a compound of formula (I) wherein R is phenyl and $R_1$ is diphenylphosphonomethyl and $R_2$ is cyanomethyl and n is 2 as a yellow oil, 1.2 g (7.2%), $n_D^{25} = 1.5802$, m/e FDMS 666 and an analysis Calculated for $C_{30}H_{28}N_4O_6P_2S_2 \cdot H_2O$: C,52.63; H,4.42; N,8.18; S,9.36;
Found: C,53.01; H,4.21; N,7.71; S,8.82.

EXAMPLE XIII

Phosphonic acid thiobis [[(cyanomethyl)imino]-Bis(-methylene)]Bis-, tetraphenyl ester. To a solution of diphenylphosphonomethylglycinonitrile (15.0 g, 0.05 mol) and triethylamine (5.0 g, 0.05 mol) in toluene at $10°$ C. was slowly added a pentane solution of sulfur dichloride (2.6 g, 0.025 mol). The reaction mixture was allowed to come to room temperature slowly. The precipitate of triethylamine hydrochloride was removed by filtraton. The toluene filtrate was washed with cold aqueous 10% NaOH and cold water. On standing at room temperature the toluene layer slowly deposited a white precipitate. After 2 days this was collected by filtration and air dried to give the desired product corresponding to a compound of formula (I) wherein n is 1, R is phenyl, $R_1$ is diphenylphosphonomethyl and $R_2$ is cyanomethyl as a white solid, 6.0 g (38%), m.p. $93°–96°$ C. $^{31}P$ NMR ($-18.39$ ppm relative to $H_3PO_4$), m/e FDMS 635 and having an analysis Calculated for: $C_{30}H_{28}N_4O_6P_2S_1$: C,56.78; H,4.45; N,8.83; S,5.05
Found: C,56.80; H,4.48; N,8.82; S,5.00.

EXAMPLE XIV

Phosphonic acid, [[(cyanomethyl)[(cyclohexylamino)thio]amino]methyl]-, diphenyl ester. An oven-dried 500 ml flask cooled under nitrogen was charged with 100 ml of toluene and cooled to $-20°$ C. To it was added sulfur dichloride (5.1 g, 0.05 mol). A solution of diphenylphosphonomethylglycinonitrile (15 g, 0.05 mol) and excess triethylamine in toluene was added via cannula, maintaining the temperature below $-10°$ C. The yellow reaction mixture was stirred for 1 hour at $-20°$ C. The supernatant liquid, a toluene solution of phosphonic acid, [[(cyanomethyl-N-chlorothio)-)amino]methyl]-, diphenyl ester was removed under nitrogen and added via cannula to a solution of cyclohexylamine (4.9 g, 0.05 mol) and excess triethylamine in toluene at $-20°$ C. The yellow reaction mixture was stirred overnight and the triethylamine hydrochloride was removed by filtration. The yellow filtrate was washed with cold 10% aqueous NaOH followed by cold water, dried over $MgSO_4$, filtered, and concentrated in vacuo to a yellow oil. Purification by HPLC on a Waters Prep Pak 500 silicas gel column, eluting with 20%, ethylacetate, 80% cyclohexane afforded a solid which was recrystallized from methylene chloride/petroleum ether to give the desired product corresponding to a compound of formula (I) wherein n is 1, R is phenyl, $R_1$ is cyclohexyl and $R_2$ is hydrogen as a white solid, m.p. $85°–87°$ C. in 36% yield and having an analysis for $C_{21}H_{26}N_3O_3PS$:

Calculated: C,58.46; H,6.07; N,9.74; S,7.43;
Found: C,58.32; H,6.11; N,9.71; S,7.42.

EXAMPLE XV

The post-emergence herbicidal activity of some of the various compounds of this invention was demonstrated by greenhouse testing in the following manner. A good grade of top soil is placed in aluminum pans having holes in the bottom and compacted to a depth of 0.95 to 1.27 cm. from the top of the pan. A predetermined number of seeds of each of several dicotyledonous and monocotyledonous annual plant species and/or vegetative propagules for the perennial plant species are placed on the soil and pressed into the soil surface. The seeds and/or vegetative propagules are covered with soil and leveled. The pans are then placed on a sand bench in the greenhouse and watered from below as needed. After the plants reach the desired age (two to three weeks), each pan except for the control pans is removed individually to a spraying chamber and sprayed by means of an atomizer operating at a positive air pressure of approximately 1.46 kg/cm$^2$ absolute. The atomizer contains 6 ml. of a solution or suspension of the chemical. In that 6 ml., is an amount of a cyclohexanone emulsifying agent mixture to give a spray solution or suspension which contains about 0.4% by weight of the emulsifier. The spray solution or suspension contains a sufficient amount of the candidate chemical in order to give application rates corresponding to those set forth in the tables. The spray solution is prepared by taking an aliquot of a 1.0% by weight stock solution or suspension of the candidate chemical in an organic solvent such as acetone or tetrahydrofuran or in water. The emulsifying agent employed is a mixture comprising 35 weight percent butylamine dodecylbenzene sulfonate and 65 weight percent of a tall oil ethylene oxide condensate having about 11 moles of ethylene oxide per mole of tall oil. The pans are returned to the greenhouse and watered as before and the injury to the plants are compared to the control is observed at approximately two and four weeks as indicated in the tables under WAT and the results recorded. In some instances, the two-week observations are omitted.

The post-emergence herbicidal activity index used in Table I is as follows:

| Plant Response | Index |
|---|---|
| 0-24% control | 0 |
| 25-49% control | 1 |
| 50-74% control | 2 |
| 75-99% control | 3 |
| 100% control | 4 |

The plant species utilized in these tests are identified by letter in accordance with the following legend:

| | |
|---|---|
| A - Canada Thistle* | K - Barnyardgrass |
| B - Cocklebur | L - Soybean |
| C - Velvetleaf | M - Sugar Beet |
| D - Morningglory | N - Wheat |
| E - Lambsquarters | O - Rice |
| F - Smartweed | P - Sorghum |
| G - Yellow Nutsedge* | Q - Wild Buckwheat |
| H - Quackgrass* | R - Hemp Sesbania |
| I - Johnsongrass* | S - Panicum Spp |
| J - Downy Brome | T - Crabgrass |

*Established from vegetative propagules. A dash (-) in the tables indicates that the particular species was absent in the test.

TABLE I

| Compound of Example No. | WAT | kg/h | A | B | C | D | E | F | G | H | I | J | K |
|---|---|---|---|---|---|---|---|---|---|---|---|---|---|
| I | 4 | 11.2 | 1 | 3 | 3 | 2 | 4 | 4 | 1 | 0 | 2 | 2 | 3 |
|  | 4 | 5.6 | 0 | 1 | 0 | 1 | 4 | 0 | 1 | 0 | 0 | 0 | 1 |
| II | 4 | 11.2 | 3 | 3 | 3 | 2 | 4 | 2 | 2 | 4 | 4 | 2 | 4 |
|  | 4 | 5.6 | 3 | 3 | 2 | 2 | 4 | 0 | 1 | 3 | 4 | 1 | 3 |
| III | 4 | 11.2 | 1 | 3 | 1 | 2 | 3 | 0 | 1 | 2 | 4 | 1 | 3 |
|  | 4 | 5.6 | 1 | 1 | 1 | 1 | 4 | 0 | 1 | 0 | 0 | 0 | 2 |
| IV | 4 | 11.2 | 2 | 3 | 1 | 2 | 4 | 2 | 2 | 1 | 2 | 2 | 3 |
|  | 4 | 5.6 | 4 | 2 | 1 | 2 | 3 | 2 | 1 | 0 | 2 | 1 | 3 |
| V | 4 | 11.2 | — | 4 | 3 | 2 | 4 | 1 | 3 | 4 | 4 | 3 | 2 |
|  | 4 | 5.6 | — | 3 | 1 | 1 | 4 | 3 | 2 | 1 | 3 | 0 | 3 |
| VI | 4 | 11.2 | — | 3 | 3 | 2 | 3 | 2 | 1 | 2 | 4 | 2 | 2 |
|  | 4 | 5.6 | — | 2 | 1 | 1 | 1 | 1 | 1 | 0 | 3 | 1 | 2 |
| VII | 4 | 11.2 | — | 1 | 0 | 1 | 4 | 0 | 1 | 0 | 3 | 0 | 2 |
|  | 4 | 5.6 | — | 0 | 0 | 1 | 3 | 0 | 1 | 0 | 2 | 0 | 1 |
| VIII | 4 | 11.2 | — | 3 | 2 | 1 | 4 | 1 | 1 | 1 | 3 | 2 | 2 |
|  | 4 | 5.6 | — | 3 | 0 | 1 | 4 | 0 | 2 | 1 | 0 | 0 | 2 |
| IX | 4 | 11.2 | 3 | 2 | 0 | 1 | 1 | 0 | 1 | 0 | 2 | 0 | 2 |
|  | 4 | 5.6 | 0 | 2 | 0 | 1 | 0 | 0 | 1 | 0 | 1 | 0 | 0 |
| X | 5 | 11.2 | 2 | 3 | 3 | 2 | 4 | — | 0 | 2 | 3 | 2 | 2 |
|  | 5 | 5.6 | 1 | 3 | 3 | 2 | 3 | — | 0 | 0 | 0 | 2 | 2 |
| XI | 4 | 11.2 | 1 | 4 | 2 | 2 | 4 | — | 0 | 2 | 4 | 2 | 3 |
|  | 4 | 5.6 | 2 | 3 | 2 | 1 | 4 | — | 0 | 1 | 3 | 1 | 2 |
| XII | 4 | 11.2 | 0 | 1 | 0 | 1 | 3 | 1 | 0 | 0 | 1 | 0 | 1 |
|  | 4 | 5.6 | 0 | 1 | 0 | 1 | 1 | 0 | 0 | 0 | 0 | 0 | 0 |
| XIII | 4 | 11.2 | 1 | 2 | 1 | 1 | 2 | 1 | 1 | 0 | 3 | 1 | 1 |
|  | 4 | 5.6 | 0 | 1 | 0 | 1 | 2 | 0 | 1 | 1 | 0 | 0 | 1 |

TABLE II

| Compound of Example No. | WAT | kg/h | L | M | N | O | P | B | Q | D | R | E | F | C | J | S | K | T |
|---|---|---|---|---|---|---|---|---|---|---|---|---|---|---|---|---|---|---|
| I | 4 | 5.6 | 3 | 4 | 3 | 3 | 4 | 3 | 3 | 2 | 4 | 4 | 2 | 3 | 1 | 4 | 4 | 4 |
|  | 4 | 1.12 | 1 | 1 | 1 | 1 | 2 | 2 | 1 | 1 | 0 | 3 | 1 | 1 | 0 | 3 | 2 | 3 |
|  | 4 | 0.28 | 1 | 0 | 0 | 0 | 1 | 2 | 1 | 0 | 3 | 2 | 2 | 0 | 0 | 1 | 1 | 1 |
| II | 4 | 5.6 | 1 | 1 | 2 | 2 | 4 | 3 | 2 | 2 | 1 | 4 | — | 1 | 1 | 2 | 3 | 3 |

TABLE II-continued

| Compound of Example No. | WAT | kg/h | L | M | N | O | P | B | Q | D | R | E | F | C | J | S | K | T |
|---|---|---|---|---|---|---|---|---|---|---|---|---|---|---|---|---|---|---|
| | 4 | 1.12 | 1 | 1 | 0 | 0 | 3 | 2 | 1 | 2 | 0 | 3 | 0 | 0 | 1 | 1 | 2 | 3 |
| | 4 | 0.28 | 0 | 0 | 1 | 0 | 1 | 0 | 0 | 1 | 0 | 4 | 0 | 0 | 0 | 0 | 1 | 2 |
| | 2 | 0.056 | 0 | 0 | 0 | 0 | 0 | 0 | 0 | 0 | 0 | 0 | 0 | 0 | 0 | 0 | 0 | 0 |
| III | 4 | 5.6 | 1 | 1 | 2 | 1 | 3 | 3 | 2 | 2 | 1 | 4 | 1 | 1 | 1 | 2 | 2 | 3 |
| | 4 | 1.12 | 1 | 1 | 0 | 0 | 3 | 1 | 0 | 2 | 1 | 2 | 1 | 0 | 1 | 0 | 2 | 3 |
| IV | 2 | 5.6 | 1 | 1 | 1 | 1 | 1 | 2 | 1 | 1 | 1 | 3 | — | 1 | 1 | 1 | 2 | 3 |
| | 4 | 5.6 | 1 | 1 | 1 | 1 | 2 | 3 | 2 | 2 | 1 | 3 | — | 1 | 1 | 1 | 2 | 3 |
| | 4 | 1.12 | 0 | 0 | 0 | 0 | 1 | 1 | 1 | 1 | 0 | 1 | — | 0 | 0 | 0 | 1 | 2 |
| | 2 | 0.28 | 0 | 0 | 0 | 0 | 0 | 0 | 0 | 0 | 0 | 0 | — | 0 | 0 | 0 | 0 | 1 |
| V | 4 | 5.6 | 2 | 1 | 1 | 2 | 3 | 3 | 2 | 2 | 1 | 4 | 3 | 3 | 1 | 1 | 3 | 3 |
| | 4 | 1.12 | 1 | 0 | 0 | 0 | 2 | 2 | 2 | 1 | 0 | 1 | 1 | 0 | 0 | 0 | 0 | 1 |
| | 2 | 0.28 | 0 | 0 | 0 | 0 | 0 | 0 | 0 | 0 | 0 | 0 | 0 | 0 | 0 | 0 | 0 | 0 |
| | 2 | 0.056 | 0 | 0 | 0 | 0 | 0 | 0 | 0 | 0 | 0 | 0 | 0 | 0 | 0 | 0 | 0 | 0 |
| VI | 4 | 5.6 | 2 | 2 | 2 | 2 | 1 | 1 | 2 | 1 | 1 | 3 | 2 | 1 | 0 | 0 | 2 | 3 |
| | 2 | 1.12 | 0 | 0 | 0 | 0 | 0 | 0 | 0 | 0 | 0 | 1 | 0 | 0 | 0 | 0 | 0 | 0 |
| | 2 | 0.28 | 0 | 0 | 0 | 0 | 0 | 0 | 0 | 0 | 0 | 0 | 0 | 0 | 0 | 0 | 0 | 0 |
| VII | 2 | 5.6 | 0 | 0 | 1 | 0 | 0 | 0 | 0 | 0 | 0 | 1 | 1 | 0 | 0 | 0 | 1 | 2 |
| | 2 | 1.12 | 0 | 0 | 0 | 0 | 0 | 0 | 0 | 0 | 0 | 0 | 0 | 0 | 0 | 0 | 0 | 1 |
| | 2 | 0.28 | 0 | 0 | 0 | 0 | 0 | 0 | 0 | 0 | 0 | 0 | 0 | 0 | 0 | 0 | 0 | 0 |
| VIII | 4 | 5.6 | 2 | 3 | 2 | 4 | 3 | 3 | 3 | 2 | 4 | 4 | 4 | 3 | 3 | 3 | 3 | 4 |
| | 4 | 1.12 | 0 | 2 | 1 | 0 | 2 | 2 | 1 | 0 | 0 | 4 | 3 | 1 | 1 | 1 | 1 | 3 |
| | 2 | 0.28 | 0 | 0 | 0 | 0 | 0 | 0 | 0 | 0 | 0 | 0 | 0 | 0 | 0 | 0 | 0 | 0 |
| | 2 | 0.056 | 0 | 0 | 0 | 0 | 0 | 0 | 0 | 0 | 0 | 0 | 0 | 0 | 0 | 0 | 0 | 0 |
| X | 4 | 5.6 | 2 | 3 | 0 | 3 | 3 | 4 | 2 | 0 | 2 | 4 | — | 1 | 3 | 1 | 4 | 4 |
| | 4 | 1.12 | 0 | 0 | 0 | 0 | 2 | 3 | 0 | 0 | 0 | 2 | — | 1 | 0 | 0 | 0 | 2 |
| | 2 | 0.28 | 0 | 0 | 0 | 0 | 0 | 0 | 0 | 0 | 0 | 0 | — | 0 | 0 | 0 | 0 | 1 |
| | 2 | 0.056 | 0 | 0 | 0 | 0 | 0 | 0 | 0 | 0 | 0 | 0 | — | 0 | 0 | 0 | 0 | 0 |
| XI | 4 | 5.6 | 3 | 4 | 3 | 4 | 4 | 4 | 4 | 3 | 3 | 4 | — | 3 | 3 | 3 | 3 | 4 |
| | 2 | 1.12 | 0 | 0 | 0 | 0 | 0 | 2 | 0 | 0 | 0 | 2 | — | 2 | 0 | 0 | 0 | 1 |
| | 2 | 0.28 | 0 | 0 | 0 | 0 | 0 | 0 | 0 | 0 | 0 | 2 | — | 0 | 0 | 0 | 0 | 0 |

EXAMPLE XVI

The pre-emergent herbicidal activity of various compounds of this invention is demonstrated as follows. A good grade of top soil is placed in aluminum pans and compacted to a depth of 0.95 to 1.27 cm. from the top of each pan. A predetermined number of seeds or vegetative propagules of each of several plant species are placed on top of the soil in each pan and then pressed down. Herbicidal compositions prepared as in the previous example are applied by admixture with or incorporation in the top layer of soil.

In this method, the soil required to cover the seeds and propagules is weighed and admixed with a herbicidal composition containing a known amount of the active ingredient (compound of this invention). The pans are then filled with the admixture and leveled. Watering is carried out by permitting the soil in the pans to absorb moisture through apertures in the pan bottoms. The seed and propagule containing pans are placed on a wet sand bench and maintained for approximately two weeks under ordinary conditions of sunlight and watering. At the end of this period, the number of emerged plants of each species is noted and compared to an untreated control. The data is given in Table III.

The pre-emergent herbicidal activity index used below is based upon average percent control of each species as follows:

| Percent Control | Index |
|---|---|
| 0–24% control | 0 |
| 25–49% control | 1 |
| 50–74% control | 2 |
| 75–100% control | 3 |

Plant species in the table are identified by the same code letters used in the previous example.

TABLE III

| Compound of Example No. | WAT | kg/h | A | B | C | D | E | F | G | H | I | J | K |
|---|---|---|---|---|---|---|---|---|---|---|---|---|---|
| I | 2 | 11.2 | 3 | — | 0 | 0 | 0 | 0 | 0 | 1 | 0 | 0 | — |
| II | 2 | 11.2 | 3 | 0 | 0 | 0 | 0 | 0 | 0 | 1 | 3 | 0 | 0 |
| III | 2 | 11.2 | 3 | 0 | 0 | 0 | 1 | 0 | 0 | 0 | 2 | 0 | 1 |
| IV | 2 | 11.2 | — | 0 | 0 | 0 | 0 | 0 | 0 | 0 | 1 | 0 | 1 |
| V | 2 | 11.2 | — | 0 | 0 | 0 | 0 | 0 | 0 | 3 | 2 | 0 | 1 |
| VI | 2 | 11.2 | — | 0 | 0 | 0 | 0 | 0 | 0 | 0 | 0 | 0 | 0 |
| VII | 2 | 11.2 | 3 | 0 | 1 | 0 | 0 | 0 | 0 | 0 | 0 | 0 | 0 |
| VIII | 2 | 11.2 | 0 | 0 | 0 | 0 | 0 | 0 | 0 | 0 | 0 | 0 | 0 |
| IX | 2 | 11.2 | 1 | 0 | 0 | 0 | 0 | 0 | 0 | 0 | 1 | 0 | 0 |
| X | 2 | 11.2 | 0 | 0 | 0 | 0 | 0 | — | 0 | 0 | 0 | 0 | 0 |
| XI | 2 | 11.2 | — | 0 | 0 | 0 | 0 | — | 0 | 0 | 3 | 0 | 0 |
| XII | 2 | 11.2 | 0 | 0 | 0 | 1 | 0 | 0 | 0 | 0 | 0 | 0 | 0 |
| XIII | 2 | 11.2 | 0 | 0 | 0 | 0 | 0 | 0 | 0 | 0 | 0 | 0 | 0 |

From the test results presented in Tables I and II, it can be seen that the post-emergent herbicidal activity of the compounds of this invention is, for the most part, general in nature. In certain specific instances, however, some selectivity is demonstrated. In this regard it should be recognized that each individual species selected for the above tests is a representative member of a recognized family of plant species.

From Table III, it can be seen that the pre-emergent herbicidal activity demonstrated some selectivity.

The herbicidal compositions, including concentrates which require dilution prior to application to the plants, of this invention contain from 5 to 95 parts by weight of at least one compound of this invention and from 5 to 95 parts by weight of an adjuvant in liquid or solid form, for example, from about 0.25 to 25 parts by weight of wetting agent, from about 0.25 to 25 parts by weight of a dispersant and from 4.5 to about 94.5 parts by weight of inert liquid extender, e.g., water, acetone, tetrahydrofuran, all parts being by weight of the total composition. Preferably, the compositions of this invention contain from 5 to 75 parts by weight of at least one compound of this invention, together with the adjuvants. Where required, from about 0.1 to 2.0 parts by weight of the inert liquid extender can be replaced by a corrosion inhibitor such as ethanol mercaptan, sodium thiosulfate, dodecylmono or dimercaptan or anti-foaming agent such as a dimethylpolysiloxane, or both. The compositions are prepared by admixing the active ingredient with an adjuvant including diluents, extenders, carriers and conditioning agents to provide compositions in the form of finely-divided particulate solids, pellets, solutions, dispersions or emulsions. Thus, the active ingredient can be used with an adjuvant such as a finely-divided solid, a liquid of organic origin, water, a wetting agent, a dispersing agent, an emulsifying agent or any suitable combination of these.

The herbicidal compositions of this invention, particularly liquids and soluble powders, preferably contain as a conditioning agent one or more surface-active agents in amounts sufficient to render a given composition readily dispersible in water or in oil. The incorporation of a surface-active agent into the compositions greatly enhances their efficacy. By the term "surface-active agent", it is understood that wetting agents, dispersing agents, suspending agents and emulsifying agents are included therein. Anionic, cationic and nonionic agents can be used with equal facility.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters petroleum sulfonates, sulfonated vegetable oils, polyoxyethylene derivatives of phenols and alkylphenols (particularly isooctylphenol and nonylphenol) and polyoxyethylene derivatives of the mono-higher fatty acid esters of hexitol anhydrides (e.g., sorbitan). Preferred dispersants are methyl cellulose, polyvinyl alcohol, sodium lignin, sulfonates, polymeric alkyl naphthalene sulfonates, sodium naphthalene sulfonate, polymethylene bisnaphthalenesulfonate and sodium N-methyl-N-(long chain acid) taurates.

When operating in accordance with the present invention, effective amounts of the compounds or compositions of this invention are applied to the plants, or to soil containing the plants, or are incorporated into aquatic media in any convenient fashion. The application of liquid and particulate solid compositions to plants or soil can be carried out by conventional methods, e.g., power dusters, boom and hand sprayers and spray dusters. The compositions can also be applied from airplanes as a dust or a spray because of their effectiveness at low dosages. The application of herbicidal compositions to aquatic plants is usually carried out by adding the compositions to the aquatic media in the area where control of the aquatic plants is desired.

The application of an effective amount of the compounds or compositions of this invention to the plant is essential and critical for the practice of the present invention. The exact amount of active ingredient to be employed is dependent upon the response desired in the plant as well as such other factors as the plant species and stage of development thereof, and the amount of rainfall as well as the specific glycine employed. In foliar treatment for the control of vegetative growth, the active ingredients are applied in amounts from about 0.112 to about 56.0 or more kilograms per hectare. In pre-emergent treatments, the rate of application can be from about 5.6 to about 22.4 or more kilograms per hectare. In applications for the control of aquatic plants, the active ingredients are applied in amounts of from about 1.0 parts per million to about 1000 parts per million, based on the aquatic medium. An effective amount for phytotoxic or herbicidal control is that amount necessary for overall or selective control, i.e., a phytotoxic or herbicidal amount. It is believed that one skilled in the art can readily determine from the teachings of this specification, including examples, the approximate application rate.

There are several possible methods for applying liquid compositions of this invention to emerged plants. Such methods include the use of wiper systems whereby the plant to be treated is contacted with an absorbent material containing the particular liquid composition, a portion of which is thereby released onto the plant upon contact therewith. Such wiper systems typically comprise a reservoir of the liquid composition into which a portion of the absorbent material is placed and is fed therethrough. Generally, substances employable as absorbent material include substances of any shape or form capable of absorbing the liquid composition and releasing a portion of the same upon contact with the plant. Typical absorbent materials include felt, foam rubber, cellulose, nylon, sponges, hemp, cotton, burlap, polyester over acrylic, combinations thereof and the like. Forms of absorbent material include rope, twine, string, cloths, carpets, combinations thereof and the like. These forms may be assembled in any manner desired including a pipe rope wick, a wedge rope wick, a multi-rope wick and the like.

In another possible application method, liquid compositions may be selectively applied to weeds by the use of recirculating sprayer systems wherein the recirculating spray unit is mounted on a tractor or high clearance mobile equipment and the spray is directed horizontally onto the weeds growing over a crop. Spray not intercepted by the weeds is collected in a recovery chamber before contacting the crop and is reused. Roller applications may also be employed to apply liquid compositions to weeds growing over a crop.

In yet another possible application method, shielded applicators may be employed to direct the liquid composition in the form of a spray onto the weeds while effectively shielding the crops from the spray.

These and other possible application methods for selectively applying liquid compositions to weeds are discussed in detail in Innovative Methods of Post-Emergence Weed Control, McWhorter C. G., Southern Weed Science Society, 33rd Annual Meeting Proceedings, Jan. 15-17, 1980; Auburn University Printing Service, Auburn, Alabama U.S.A., the teachings of which are incorporated herein by reference in their entirety.

Another possible method of applying liquid compositions of this invention to plants includes controlled droplet application which is also known as the ultra low-volume chemical application. Controlled droplet application involves the production of uniform or nearly uniform spray drops of a predetermined size and the conveyance of these drops with negligible evaporation to a spray target. In particular, this method comprises feeding spray solutions to a rotary atomizer comprising a small disk with serrated edges that disperses liquid into droplets as the disk spins. Different droplet sizes are produced by changing solution flow rates to the spinning disk or changing the speed of rotation of the disk.

Those of skill in the art will recognize that the physical and chemical characteristics of the compound or composition employed will determine to a large extent the particular application method selected therewith.

The aforementioned and other methods for applying liquid compositions to plants are discussed in detail in "Rope Wick Applicator—Tool With a Future", Dale, James E., pp. 3-4, "The Recirculating Sprayer and Roundup® Herbicide", Derting, Claude W., pp. 5-7, and "C.D.A. Herbicide Application", McGarvey, Frank X., Weeds Today, Volume 11, Number 2, pp. 8-9, Late Spring, 1980, 309 W. Clark St., Champaign, Ill., the teachings of which are incorporated herein by reference in their entirety.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

What is claimed is:

1. A method of controlling undesired plants which comprises applying to said plants or plant growth medium a herbicidally effective amount of a compound of the formula (I)

wherein n is an integer 1 or 2 and wherein R is selected from the group consisting of phenyl, naphthyl, or biphenylyl; or phenyl, naphthyl or biphenylyl substituted with from 1 to 3 substituents independently selected from the group consisting of lower alkyl, lower alkoxy, lower alkylthio, alkoxycarbonyl, methylenedioxy, trifluoromethyl, cyano, nitro and halogen; and wherein $R_1$ and $R_2$ are independently selected from the group consisting of hydrogen, cycloalkyl, alkyl, alkyl substituted with 1 or 2 substituents independently selected from the group consisting of lower alkoxy, lower alkylthio, cyano, lower alkoxycarbonyl, bis(aryloxy)phosphinyl wherein said aryl portion thereof corresponds to a group selected from R, phenyl or phenyl substituted with 1 or 2 substituents independently selected from the group consisting of lower alkyl and lower alkoxy, acyl or aroyl; or $R_1$ and $R_2$ are independently selected from the aforerecited groups and joined together to form a cyclic structure having 4–8 atoms therein.

2. A method of claim 1, wherein n is 1.

3. A method of claim 1, wherein R is phenyl.

4. A method of claim 1, wherein said compound is phosphonic acid, (((cyanomethyl)(dibutylamino)thio)amino)methyl)diphenyl ester.

5. A method of claim 1, wherein R is phenyl substituted with 1 or 2 substituents selected from the group consisting of lower alkoxy, lower alkyl and halogen.

6. A method of claim 1, wherein said compound is phosphonic acid, (((cyanomethyl) (diethylamino)thio)amino)methyl)bis(2-methoxyphenyl) ester.

7. A method of claim 1, wherein $R_1$ and $R_2$ are joined together to form a cyclic arrangement having 4–8 carbon atoms therein.

8. A method of claim 1, wherein said compound is phosphonic acid, (((cyanomethyl) (1-piperidinylthio)amino)methyl)-bix-(4-chloro-3-methylphenyl) ester.

9. A method of claim 1, wherein said compound is phosphonic acid, [[[(cyanomethyl)[(N,N-dimethylamino)thio]amino]methyl]-, diphenyl ester.

10. A method of claim 1, wherein said compound is phosphonic acid, ((((bis(1-methylethyl)amino)thio)(-cyanomethyl)amino)methyl)-, diphenyl ester.

11. A method of claim 1, wherein $R_1$ and $R_2$ are not the same.

12. A method of claim 1, wherein said compound is phosphonic acid, [thiobis[[(cyanomethyl)imino]bis(methylene)]-bis-, tetraphenyl ester.

13. A method of claim 1, wherein said compound is phosphonic acid, [[(cyanomethyl)](cyclohexylamino)-thio]amino]-methyl]-, diphenyl ester.

14. A method of claim 1, wherein n is 2 and R is phenyl.

15. A method of claim 1, wherein said compound is phosphonic acid, dithiobis[[(cyanomethyl)imino]bis(-methylene)]-bis-, tetraphenyl ester.

16. A compound of the formula (I)

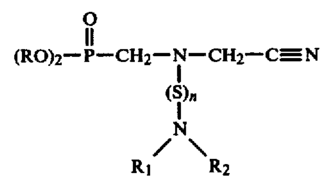

wherein n is an integer 1 or 2 and wherein R is selected from the group consisting of phenyl, naphthyl, or biphenylyl; or phenyl, naphthyl or biphenylyl substituted with from 1 to 3 substituents independently selected from the group consisting of lower alkyl, lower alkoxy, lower alkylthio, alkoxycarbonyl, methylenedioxy, trifluoromethyl, cyano, nitro and halogen; and wherein $R_1$ and $R_2$ are independently selected from the group consisting of hydrogen, cycloalkyl, alkyl, alkyl substituted with 1 or 2 substituents independently selected from the group consisting of lower alkoxy, lower alkylthio, cyano, lower alkoxycarbonyl, bis(aryloxy)phosphinyl wherein said aryl portion thereof corresponds to a group selected from R; phenyl or phenyl substitued with 1 or 2 substituents independently selected from the group consisting of lower alkyl and lower alkoxy; acyl or aroyl; or $R_1$ and $R_2$ are independently selected from the aforerecited groups and joined together to form a cyclic structure having 4–8 atoms therein.

17. A compound of claim 16, wherein n is 1.

18. A compound of claim 17, wherein R is phenyl.

19. A compound of claim 18, wherein $R_1$ and $R_2$ are the same.

20. A compound of claim 19, wherein said compound is phosphonic acid, (((cyanomethyl)(dibutylamino)thio)amino)methyl)- diphenyl ester.

21. A compound of claim 18, wherein R is phenyl substituted with 1 or 2 substituents selected from the group consisting of lower alkoxy, lower alkyl and halogen.

22. A compound of claim 21, wherein said compound is phosphonic acid, (((cyanomethyl)(diethylamino)thio)amino)methyl)-, bis(2-methoxyphenyl) ester.

23. A compound of claim 18, wherein $R_1$ and $R_2$ are joined together to form a cyclic arrangement having 4–8 carbon atoms therein.

24. A compound of claims 21 wherein said compound is phosphonic acid, (((cyanomethyl)(1-piperidinylthio)amino)methyl)-bis-(4-chloro-3-methylphenyl) ester.

25. A compound of claim 19, wherein said compound is phosphonic acid, [[[(cyanomethyl)[(N,N-dimethylamino)-thio]amino]methyl]-, diphenyl ester.

26. A compound of claim 19, wherein said compound is phosphonic acid, ((((bis(1-methylethyl)amino)thio)(cyanomethyl)amino)methyl-, diphenyl ester.

27. A compound of claim 18, wherein $R_1$ and $R_2$ are not the same.

28. A compound of claim 27, wherein said compound is phosphonic acid, [thiobis[[(cyanomethyl)-imino]bis(methylene)]bis-, tetraphenyl ester.

29. A compound of claim 27, wherein said compound is phosphonic acid, [[(cyanomethyl)[(cyclohexylamino)thio]amino]methyl]-, diphenyl ester.

30. A compound of claim 16, wherein n is 2 and R is phenyl.

31. A compound of claim 30, wherein said compound is phosphonic acid, dithiobis[[(cyanomethyl)imino]bis(methylene)]bis-, tetraphenyl ester.

32. A herbicidal composition comprising an inert adjuvant and a herbicidally effective amount of a compound of the formula

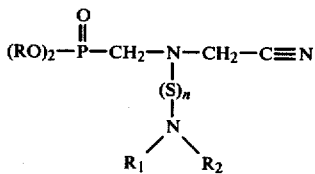

(I)

wherein n is an integer 1 or 2 and wherein R is selected from the group consisting of phenyl, naphthyl, or biphenylyl; or phenyl, naphthyl or biphenylyl substituted with from 1 to 3 substituents independently selected from the group consisting of lower alkyl, lower alkoxy, lower alkylthio, alkoxycarbonyl, methylenedioxy, trifluoromethyl, cyano, nitro and halogen; and wherein $R_1$ and $R_2$ are independently selected from the group consisting of hydrogen, cycloalkyl, alkyl, alkyl substituted with 1 or 2 substituents independently selected from the group consisting of lower alkoxy, lower alkylthio, cyano, lower alkoxycarbonyl, bis(aryloxy)-phosphinyl wherein said aryl portion thereof corresponds to a group selected from R; phenyl or phenyl substituted with 1 or 2 substituents independently selected from the group consisting of lower lower alkoxy; acyl or aroyl; or $R_1$ and $R_2$ are independently selected from the aforerecited groups and joined together to form a cyclic structure having 4–8 atoms therein.

33. The herbicidal composition of claim 32, wherein n is 1.

34. The herbicidal composition of claim 32, wherein R is phenyl.

35. The herbicidal composition of claim 32, wherein $R_1$ and $R_2$ are the same.

36. The herbicidal composition of claim 32, wherein said compound is phosphonic acid, (((cyanomethyl)(dibutylamino)thio)amino)methyl)-diphenyl ester.

37. The herbicidal composition of claim 32, wherein R is phenyl substituted with 1 or 2 substituents selected from the group consisting of lower alkoxy, lower alkyl and halogen.

38. The herbicidal composition of claim 32, wherein said compound is phosphonic acid, (((cyanomethyl)(diethylamino)thio)amino)methyl)-, bis(2-methoxyphenyl) ester.

39. The herbicidal composition of claim 32, wherein $R_1$ and $R_2$ are joined together to form a cyclic arrangement having 4–8 carbon atoms therein.

40. The herbicidal composition of claim 32, wherein said compound is phosphonic acid, (((cyanomethyl)(1-piperidinylthio)amino)methyl)-bis-(4-chloro-3-methylphenyl) ester.

41. The herbicidal composition of claim 32, wherein said compound is phosphonic acid, [[[(cyanomethyl)[(N,N-dimethylamino)thio]amino]methyl]-, diphenyl ester.

42. The herbicidal composition of claim 32, wherein said compound is phosphonic acid, ((((bis(1-methylethyl)amino)thio)(cyanomethyl)amino)methyl)-, diphenyl ester.

43. The herbicidal composition of claim 32, wherein $R_1$ and $R_2$ are not the same.

44. The herbicidal composition of claim 32, wherein said compound is phosphonic acid, [thiobis[[(cyanomethyl)imino]bis(methylene)]bis-, tetraphenyl ester.

45. The herbicidal composition of claim 32, wherein said compound is phosphonic acid, [[(cyanomethyl)[(cyclohexylamino)thio]amino]methyl]-, diphenyl ester.

46. The herbicidal composition of claim 32, wherein said n is 2 and R is phenyl.

47. The herbicidal composition of claim 32, wherein said compound is phosphonic acid, dithiobis[[(cyanomethyl)imino]-bis(methylene)]bis-, tetraphenyl ester.

* * * * *